Aug. 12, 1958    J. O. HAMILTON ET AL    2,847,609
REFLEX KLYSTRON

Filed Feb. 11, 1957    3 Sheets-Sheet 1

INVENTORS: J. O. HAMILTON
J. P. LAICO
BY
ATTORNEY

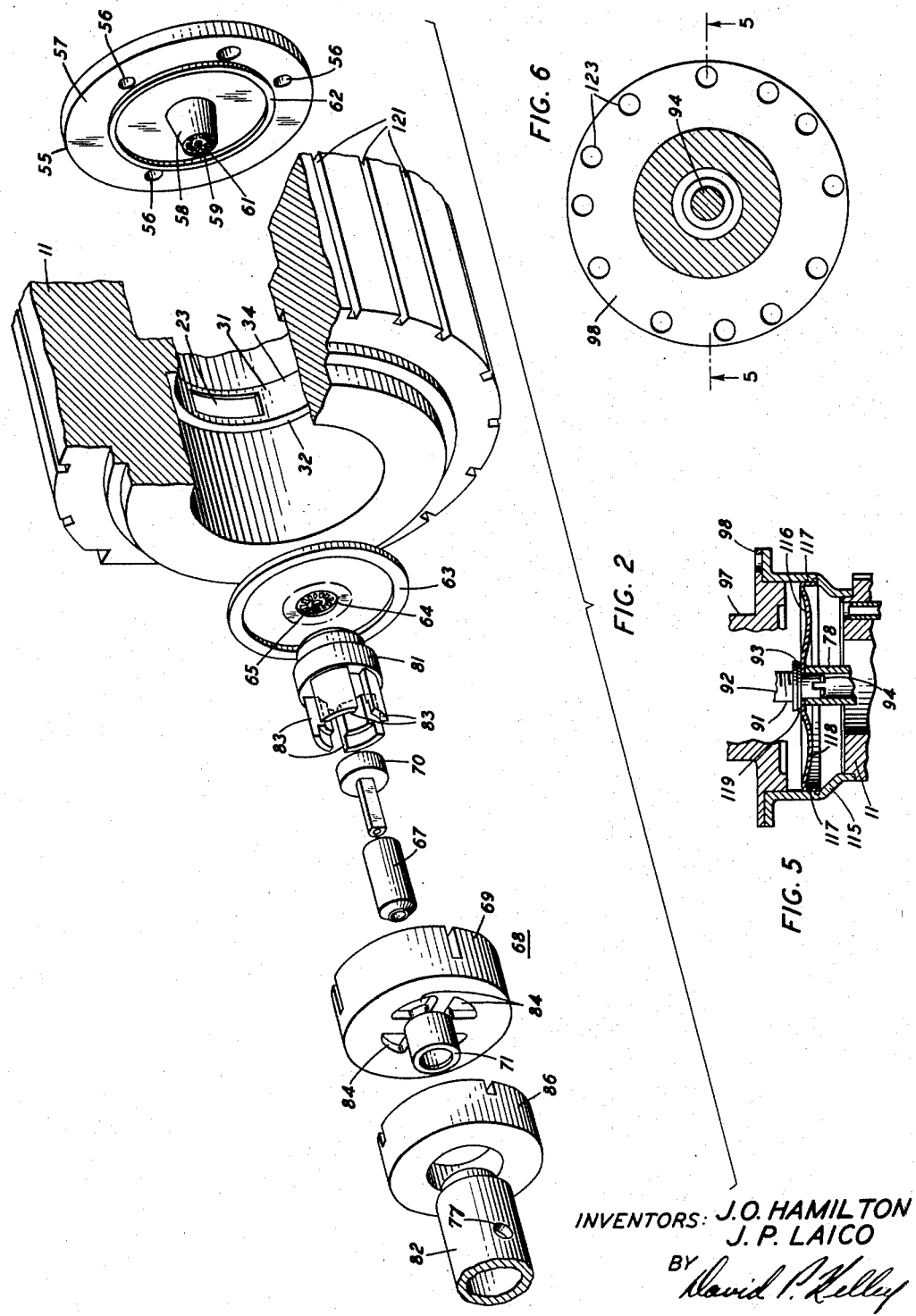

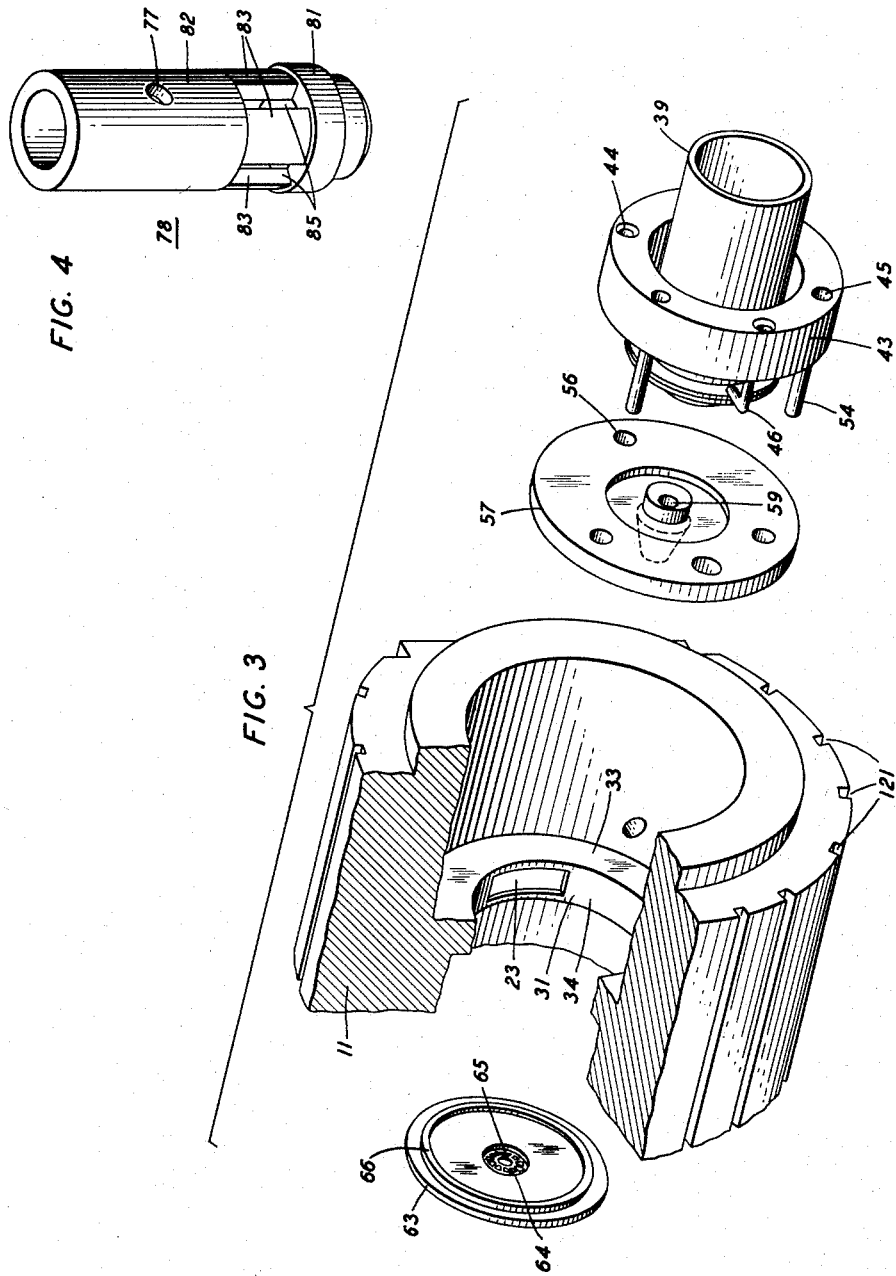

United States Patent Office 2,847,609
Patented Aug. 12, 1958

2,847,609

REFLEX KLYSTRON

James O. Hamilton, Allentown, Pa., and Joseph P. Laico, Springfield, N. J., assignors to Bell Telephone Laboratories, Incorporated, New York, N. Y., a corporation of New York Application February 11, 1957, Serial No. 639,313

15 Claims. (Cl. 315—5.22)

This invention relates to electron discharge devices and, more particularly, to manually tunable velocity variation oscillators of the reflex type having a single cavity resonator.

Reflex type velocity variation oscillators comprise, in general, a cavity resonator having a gap therein across which an electron stream is projected. The radio frequency field in the gap acts upon the electrons in the stream to vary their velocities, and, after the stream emerges from the gap, it enters a region where these velocity variations are converted to density variations. A repeller electrode within this region acts to reverse the direction of travel of the stream back toward the gap and, upon entering the gap in the reverse travel, the density variations of the stream cause energy to be given up to the resonator, thereby sustaining oscillations.

The frequency of oscillations generated depends upon the transit time of the electrons across the gap in the forward direction, and, in general, the higher the frequency desired, the shorter the transit time. In addition, the higher the frequency desired, the smaller the physical dimensions of the electrodes and resonators must be. In a high frequency oscillator of this type designed for operation in, for example, the 11,000 megacycle per second range, the physical dimensions of the electrodes are quite small. In such a tube, for maximum efficiency, the proper alignment and spacing of the electrodes becomes extremely critical, the slightest deviations from the optimum physical relationship of the electrodes resulting in serious impairment of the operating efficiency, or even complete inoperativeness.

In reflex oscillators of the cavity resonator type, one method of adjusting frequency is by varying the gap size, so that for a given average electron velocity, the transit time is made to vary as the gap size. However, in tubes designed for operation at such high frequencies as the aforementioned, the gap is exceedingly small, and accurate adjustment correspondingly more difficult to obtain. Furthermore, it becomes increasingly more difficult to maintain accurate frequency adjustment inasmuch as the deleterious effects of such things as mechanical vibrations and backlash in the adjusting mechanism are greatly magnified as electrode and gap size are made smaller.

It is an object of this invention to facilitate the construction of reflex oscillators and to expedite the realization of accurate electrode alignment and spacing in an oscillator designed for operation at exceedingly high frequencies.

Another object of this invention is to enhance the accuracy of the frequency adjustment of a reflex oscillator and maintain the adjustment against harmful mechanical effects.

A further object of this invention is to increase the mechanical stability and strength of tunable reflex oscillators whereby such a device may withstand severe shocks without impairment of its operating efficiency and will have unusually long life.

In an illustrative embodiment of this invention, an electron discharge device comprises an evacuated enclosure having therein a cavity resonator type reflex oscillator arrangement of electrodes, a wave guide output section associated with the cavity resonator, and a manual tuning arrangement for adjusting the frequency of the oscillator by varying the gap size in the resonator.

In accordance with one feature of this invention, the evacuated enclosure includes a hollow body member having an accurately machined annular flange on its inner wall. The several electrode elements are all positioned within the body and either bear against this flange or are supported from it in a manner such that exceedingly accurate alignment and spacing of the electrodes is obtained. More particularly, the inner surface of the flange is made to serve as the side wall of a circular cavity resonator. A flexible diaphragm having a central opening with a grid therein and having an annular locating flange thereon bears against one of the walls of the body flange, and an accelerating anode having a grid therein and an annular locating flange thereon bears against the remaining wall of the body flange, the flange, diaphragm, and anode together forming a cavity resonator. A repeller electrode is insulatingly supported by a support member which bears against the upper surface of the body flange and which is centrally located by virtue of its bearing against the periphery of the flexible diaphragm. An electron gun sub-assembly is supported from the anode member, and is centrally located by means of support rods which are inserted in accurately positioned holes in the anode.

In accordance with another feature of this invention, a thin diaphragm member is brazed to the body member adjacent one end thereof and serves to define one end wall of the evacuated enclosure. A hollow cylindrical sleeve, centrally located, is brazed at one end to the diaphragm member, and at the other end to the flexible diaphragm of the cavity resonator. The sleeve surrounds the repeller electrode, and has apertures or slots therein through which passes the repeller supporting member. An adjusting screw is brazed to the end wall diaphragm and extends for a short distance into the hollow sleeve, thereby keeping these two elements in proper alignment with each other. A differential screw mechanism to which is connected a hand actuated cover member serves to actuate the adjusting screw. Axial movement of the adjusting screw is transmitted to the diaphragm and in turn to the sleeve member, which transmits the motion to the cavity diaphragm member, thereby varying the gap size. The repeller remains stationary during this operation.

The invention and the above-noted and other features thereof will be understood more clearly and fully from the following detailed description taken in conjunction with the accompanying drawings, in which:

Fig. 2 is an exploded perspective view of various elements of the embodiment of Fig. 1, including particularly the body and repeller assembly;

Fig. 3 is an exploded perspective view of certain other of the elements of the embodiment of Fig. 2 including particularly the body and gun assembly;

Fig. 4 is a perspective view of the assembled deflecting tube of the embodiment of Fig. 1; and Figs. 5 and 6 are partial cross sectional views of an alternative arrangement of certain of the parts, illustrative of another specific embodiment of our invention.

Figure 1:
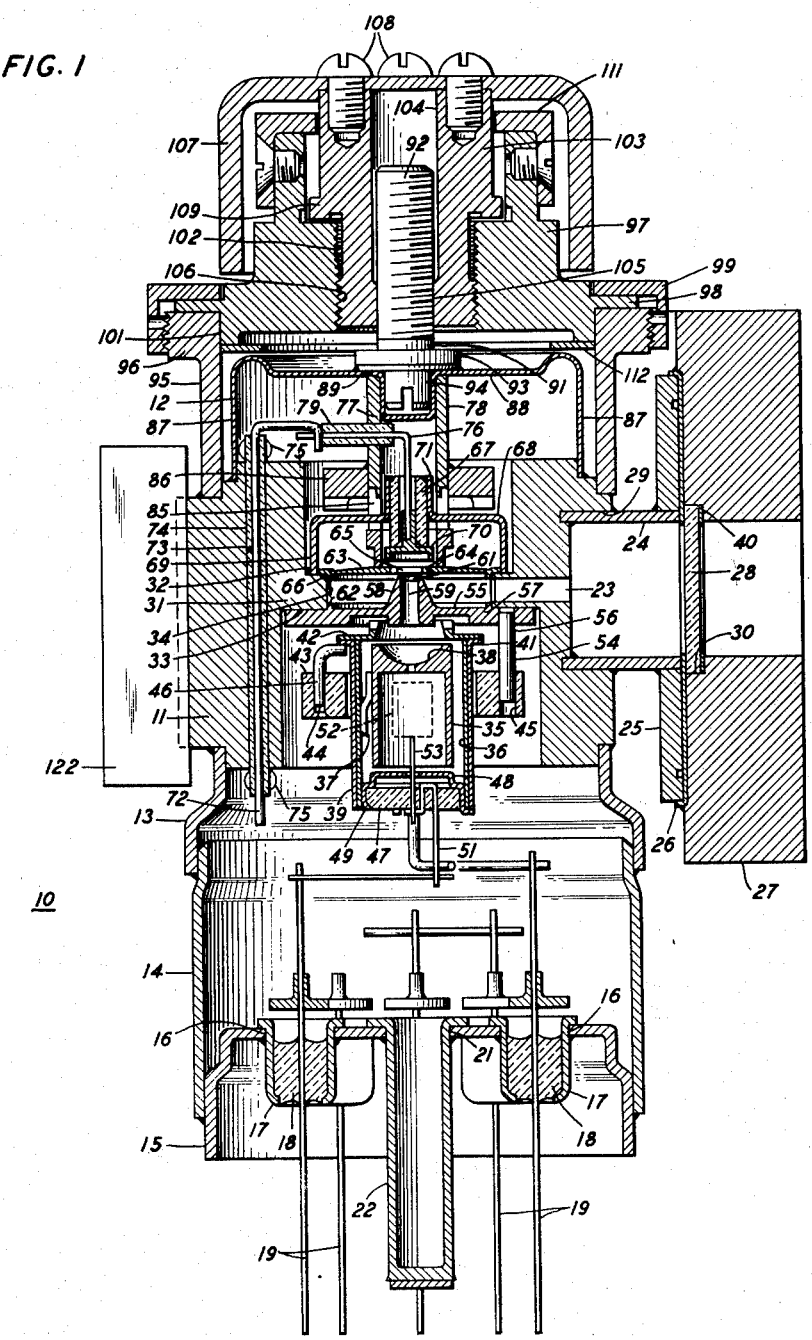
Fig. 1 is a cross sectional view of one specific embodiment of a tunable reflex klystron in accordance with our invention.

Referring now to the drawings, the electron discharge device 10 illustrated in Fig. 1 comprises an evacuated enclosure having a hollow cylindrical metallic body portion 11 forming side walls, hermetically joined at one end of which is a diaphragm 12. At the other end of the body member 11 is welded or brazed a body support member 13, from which depends a metallic bulb 14 which is brazed or welded to member 13 and which has its end closed off by a platform 15, hermetically sealed thereto. Platform 15 has a plurality of apertures 16 therein, in each of which is mounted a metal eyelet 17, hermetically joined to the platform 15 and in which is sealed a vitreous bead 18. Each bead 18 is sealed to and supports a lead-in conductor 19 which advantageously is made of an alloy such as Kovar which readily seals to glass. Centrally located in the platform 15 is an aperture 21 in which is mounted an exhaust tubulation 22 which likewise is heremetically joined to platform 15.

Communicating with the interior of the body 11 is a slot 23, the function of which will be more fully explained hereinafter. Mounted in a recess 29 in the wall of the body 11 and inclosing slot 23 is a short section of waveguide 24 which terminates in a flange 25, a metallic cup 26, and a mounting flange 27. Waveguide 24 is vacuum sealed by an electromagnetic wave permeable window 28 of suitable insulating material such as ceramic which is carried in a recess 30 in flange 27 and bears against cup 26. On the inner wall of body member 11 approximately midway between the ends thereof is a peripheral flange 31 which, for reasons which will be more apparent hereinafter, has accurately machined upper and lower surfaces 32 and 33 respectively, and a machined and polished inner surface 34. Slot 23 is so located relative to flange 31 that it communicates with the interior of body 11 through the surface 34 of flange 31, and is approximately midway between surfaces 32 and 33.

Mounted within the lower portion of body 11 is an electron gun subassembly comprising a hollow cathode 35 having at its upper end a concave electron emitting surface 38. Cathode 35 is mounted within a hollow metallic sleeve 36 by means of a plurality of metal support members 37, only one of which is shown. Preferably the cathode 35, sleeve 36, and supports 37 are made from materials having coefficients of thermal expansion such that the cathode will not shift relative to the sleeve member 36 as the parts become heated during operation of the device. A support member 39 having a flange 41 at one end thereof surrounds sleeve 36 and is welded thereto so that the upper surface of flange 41 coincides with the end of sleeve 36. A beam forming electrode 42 rests upon the upper surface of flange 41 and is affixed thereto by brazing or welding, or, alternatively, the beam forming electrode 42 may be made integral with support member 39. Encircling the support member 39 is a platform 43 of insulating material such as ceramic having a first set of holes 44 and a second set of holes 45. Mounted in the holes 44 are a plurality of support rods 46, only one of which is shown, which contact support member 39 on the under side of flange 41 and are affixed thereto by suitable means such as welding thereby serving to locate support member 39 relative to platform 43. Rods 46 are secured in holes 44 by a glass glaze, not shown, which insures a strong junction between the metal of the rods and the ceramic or alternatively, they may be secured by any suitable manner known in the art. The lower end of sleeve 36 is closed by a heater support member 47 of insulating material which is held within a heater shield 48 by a plurality of tabs 49 on shield 48 which are crimped against member 47. Shield member 48, in turn, is welded to cathode sleeve 36. Heater support leads 51, one of which is shown, extend upwardly through holes in member 47 and back down through adjacent holes. A heater 52, which is shown schematically, within the hollow cathode 35 is supported in place by heater legs 53 which extend through holes in the support member 47 and are welded to the heater support leads 51.

Mounted in holes 45 in the platform 43 are a plurality of metallic support rods 54, which preferably are secured in place by glass glaze in like manner to rods 46, and which are secured to a metallic accelerating anode 55, being inserted in a plurality of holes 56 in the anode and brazed or welded in place. Anode 55, which is best seen in Figs. 2 and 3, comprises a disc shaped portion 57 and a centrally located frustro-conical shaped nose portion 58 which has a longitudinally extending bore 59 through which the electron beam passes during tube operation, and carries an electron permeable grid 61 at its upper end, concentrically located with respect to the bore 59.

In manufacture of the tube depicted in Fig. 1, the gun subassembly described in the foregoing is assembled externally of the tube, thereby insuring precise spacing and alignment of the various components, and then inserted into the body portion 11. An annular flange 62 on the upper surface of the disc shaped portion 57 of anode 55, which is precisely machined so as to be concentric with the bore 59 in nose 58, bears against the surface 34 of body flange 31 when the gun assembly is in place, thereby accurately positioning the gun assembly relative to the flange 31. The gun assembly is located axially and held in place by brazing or welding anode 55 to the surface 33 of flange 31.

Affixed to the surface 32 of flange 31 as by brazing is a flexible metal diaphragm 63 of material such as copper which is best seen in Figs. 2 and 3. Centrally located in diaphragm 63 is a hole 64 in which an electron permeable grid 65 is located. An annular flange 66 on diaphragm 63 which is concentric with the hole 64 bears against surface 34 of flange 31, thereby serving to accurately position the grid 65 relative to the grid 61 in anode 55.

The grids 61 and 65, anode 55, diaphragm 63, and surface 34 of flange 31 together form a cavity resonator which is tunable by flexure of the diaphragm 63, and from which power may be extracted through slot 23, waveguide 24, and ceramic window 28. Slot 23 functions as an output transformer for the resonant cavity. Ordinarily such an output transformer exhibits the frequency sensitivity so that the external Q of the cavity decreases with increasing frequency. In order to compensate for this variation in the external Q with frequency, a ceramic window 28 is made circular and positioned between a first resonant iris formed by plate 26 and a second resonant iris 40. By properly choosing the dimensions of the ceramic window and the irises the center structure can be made to resonate at the low frequency end of the frequency band which the oscillator is designed to generate and transmit. As frequency increases from the low end of the band the resonant type window structure has the effect of increasing the external Q of the resonant cavity. With proper positioning of the window relative to the transformer formed by slot 23 and with proper dimensioning of the window and the transformer the decrease in external Q with frequency in the transformer is counteracted by the increase in external Q with frequency of the window so that the external Q of the cavity remains constant over substantially the entire frequency band which it is desired to transmit.

Cooperatively associated with the cavity resonator is a repeller electrode 70 which is insulatingly supported from surface 32 of flange 31 by means of a sleeve of insulating material 67 which is secured to repeller 70 by glass glazing, and a repeller support member 68, which is secured by glazing to the sleeve 67. As an alternative to glazing, sleeve 67 may be metallized and brazed to repeller 70 and member 68. Support 68 has a large hollow cylindrical portion 69 which is concentric with the small hollow cylindrical portion 71 to which sleeve 67 is secured, the inside diameter of portion 69 being machined to be a snug fit against the periphery of diaphragm 63, and affixed to flange 31 by suitable means such as brazing. Repeller 70 is concentrically located with respect to grid 65 by virtue of the snug fit between the support 68 and diaphragm 63. Voltage is applied to the repeller through a repeller lead 72 of conducting material which extends through a hole 73 drilled in body 11 and is insulated from body 11 by an insulating sleeve 74, which is retained in place by glass beads 75 that are fuzed in place at assembly or by staking of body 11 in the area surrounding 74. Lead 72 is connected by suitable means to a lead 76 which passes through a hole 77 in the side wall of a hollow cylindrical diaphragm deflection tube or sleeve 78 and is connected to the repeller 70. Lead 76 is insulated from tube 78 by means of a short insulating sleeve 79.

From the foregoing description, it can readily be seen that the gun assembly, the flexible diaphragm 63, the grids 61 and 65, and the repeller 70 are all accurately located with respect to each other by virtue of being located with respect to the flange 31. By accurate machining of flange 31 and the various parts during their fabrication, preciseness of location of the components is insured at assembly without the necessity of using expensive assembly jigs and fixtures, the structure as described being substantially self jigging. In addition, the use of flange 31 as the support for the various components as well as the base of location makes for an exceptionally rugged construction, thereby insuring long tube life from a mechanical standpoint.

Flexure of diaphragm 63 is had through an adjusting mechanism which includes diaphragm deflection tube or sleeve 78 which surrounds repeller 70 and is affixed to diaphragm 63 by brazing or the like. Referring to Figs. 2 and 4, it can be seen that tube 78 comprises two portions 81 and 82. Lower portion 81 has a plurality of axially extending fingers 83 which pass through a plurality of holes 84 in repeller support member 68, and are joined as by brazing to portion 82. It can be seen from Fig. 4 that after assembly, tube 78 comprises a hollow cylinder having a plurality of slots or openings 85 in the side wall thereof through which the repeller support member 68 extends after assembly. By virtue of sleeve 78 being made in two parts, assembly of the sleeve 78 and the repeller assembly is greatly facilitated with no loss in precision or strength in the final assembly. A stop member 86 is affixed as by brazing to sleeve 78 above the openings 85 and serves to prevent too great a movement thereof during adjustment by bearing against repeller support member 68 at the limit of safe movement of the sleeve 78 and corresponding flexure of diaphragm 63.

In the embodiment shown in Fig. 1, diaphragm 12 comprises side portions 87 which are hermetically secured to the body 11, the body 11 defining the side walls of the envelope or evacuated enclosure. Diaphragm 12 further includes an intermediate portion 88 which extends across the envelope and a central portion 89 which is joined as by brazing to tube or sleeve 78 and extends down into tube 78 for a short distance. Movement is imparted to tube 78 from an externally mounted adjusting mechanism which will be explained more fully hereinafter through a tuning member 91. Tuning member 91 comprises an upper threaded portion 92, a flange 93 which is joined as by brazing to the central portion 89 of diaphragm 12, and a lower portion 94 which extends down into tube 78 for a short distance.

The adjusting mechanism which actuates tuning member 91 comprises a hollow cylindrical portion 95 which is welded or brazed to body member 11 to form an extension of the side walls of the tube and which has at its end remote from body 11 an outwardly extending threaded flange 96. A drive body 97 having an annular flange 98 rests upon the member 95, the flange 98 bearing against the flange 96, and being held in place by a threaded locking ring 99 as best seen in Fig. 1. Drive body 97 has a machined diameter 101 below flange 98 which is a snug fit against the inside diameter of member 95, thereby ensuring concentricity of members 95 and 97. Member 97 has a concentrically located threaded bore 102 in which is threaded a drive nut 103, which in turn has a centrally located bore 104, the lower portion 105 of which is threaded to match the threads 92 on the tuning member 91. Threaded portion 105 is concentric with threads 106 on the drive nut which engage the threaded bore 102 of member 97. A cover member 107 is affixed, as by screws 108, to the drive nut 103 and serves as the means by which manual frequency adjustment may be accomplished. Rotation of cover member 107 causes a corresponding rotation of drive nut 103 and a translating movement thereof in threaded bore 102. In addition rotation of member 103 causes member 91 to move in translation through the engagement of threads 92 with threaded bore 105. The threads of bore 105 are of slightly different pitch than those of bore 102, making the translational movement of member 91 proportional to the difference in pitch of the threads. Such a differential screw arrangement provides a very precise micrometer adjustment of the movement of deflection tube 78 and hence a very accurate adjustment of the flexure of diaphragm 63. Excess translational movement of drive nut 103 is prevented by means of a shoulder 109 on the drive nut which will contact member 97 at the limit of downward translational motion and which will contact a stop ring 111 in the event of excess upward translational movement. An anti-backlash spring 112 is pressed against the inside diameter of member 95 and bears against the flange 93 on tuning member 91. Spring 112 exerts pressure against member 91 in the downward direction, thereby ensuring that the backlash existing between threaded portion 92 and the threaded bore 105 and the backlash existing between threads 106 and the threaded bore 102 are substantially eliminated. If diaphragm 12 is made flexible enough, atmospheric pressure may be relied upon to prevent backlash, and spring 112 may be dispensed with.

From the foregoing description of the tuning mechanism it can be seen that member 91 which extends into tube 78 for a short distance acts to accurately locate the upper end of deflection tube 78 relative to the body portion 11. By virtue of the unique construction of the tuning mechanism, accurate location of the various components is assured without resort to expensive assembly jigs and fixtures, the only requirement being accurate machining of the parts during their fabrication. On the other hand, despite the simplicity and ruggedness of the tuning mechanism, very precise tuning of the device is likewise assured.

In Figs. 5 and 6 there is shown an alternative structure for sealing the vacuum enclosure and transmitting adjusting movement to the tube 78. For simplicity, elements in Figs. 5 and 6 which are the same as those in Figs. 1 through 4 bear the same reference numerals. In the embodiment of Figs. 5 and 6, a member 115 is affixed as by brazing to body member 11, and forms an extension of the side walls of the envelope. A diaphragm member 116, having side portions 117 which are hermetically joined to member 115 forms an end wall of the vacuum enclosure. The intermediate portion 118 of diaphragm 116 is preferably made concave to prevent buckling of the diaphragm when it is flexed during adjustment. The central portion 119 of diaphragm 117 has a centrally located hole through which extends the lower portion 94 of member 91 into tube 78. Member 91 is joined as by brazing to the upper surface of the central portion 119, and tube 78 is joined in like manner to the underside thereof, thereby forming a vacuum tight junction through which adjusting movement can be transmitted.

Preferably diaphragm 117 is made of a material such as Monel metal which can be made quite thin and yet retain sufficient strength to maintain the vacuum integrity of the envelope. It is desirable to make diaphragm 117 as thin as possible so that it presents little or no resistance to movement of member 91 and tube 73 in each direction.

In the embodiment of Figs. 5 and 6 member 97 is bolted to the flange on member 115 by a plurality of bolts not shown which extend through holes 123 in the flange 98 of member 97. In order that precise positioning of member 97 may be accomplished a large number of irregularly spaced holes 123 are drilled and each member 97 is properly positioned, bolts are inserted in those holes which match up with the holes in the flange on member 115.

In operation of the device 10, a large amount of heat is generated, which can decrease the reliability of operation unless conducted away. To this end, member 11 has a plurality of longitudinally extending slots 121 in each of which is affixed a cooling fin 122. Fins 122 are shown in Fig. 1 as rectangular shaped pieces of metal of high heat conductivity. It is to be understood, however, that the cooling fins may take any one of a number of shapes or orientations known in the art which act efficiently to cool the device.

It is to be understood that the foregoing embodiments of the principles of the invention are for purposes of illustration, and that many other embodiments may be devised by those skilled in the art without departing from the spirit and scope of the invention.

What is claimed is:

1. An electron discharge device of the reflex klystron type comprising an envelope having an integral annular flange on its inner wall intermediate the ends thereof, means including a flexible wall member defining a cavity resonator mounted within said envelope, electron gun means situated adjacent said resonator remote from said flexible wall member for projecting a stream of electrons through said resonator, a repeller electrode, means mounting said repeller electrode to the other side of said resonator than said gun means in the path of said electron stream and adjacent said flexible wall member, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope, an intermediate portion extending across said envelope and a central portion secured to said hollow cylindrical sleeve member, and a tuning member secured to said central portion and extending into said hollow sleeve member for depressing said diaphragm, said sleeve, and said flexible wall member.

2. An electron discharge device according to claim 1 wherein the central portion of said diaphragm extends into said hollow sleeve member between said tuning member and said hollow sleeve member.

3. An electron discharge device according to claim 1 wherein the central portion of said diaphragm has an aperture therein through which said tuning member extends.

4. An electron discharge device of the reflex klystron type comprising an envelope, said envelope having an integral annular flange on its inner wall intermediate the ends thereof, means including a flexible wall member defining a cavity resonator mounted on said flange, electron gun means situated adjacent said resonator remote from said flexible wall member for projecting a stream of electrons through said resonator, a repeller electrode, means mounting said repeller electrode to the other side of said resonator than said gun means and adjacent said flexible wall member, said means being mounted on said flange, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope, an intermediate portion extending across said envelope and a central portion secured to said hollow cylindrical sleeve member, and a tuning member secured to said central portion and extending into said hollow sleeve member for depressing said diaphragm, said sleeve, and said flexible wall member.

5. An electron discharge device of the reflex klystron type comprising an envelope, said envelope having an integral annular flange on its inner wall intermediate the ends thereof, means including a flexible wall member defining a cavity resonator mounted on said flange, an accelerating anode member mounted on said flange opposite said flexible wall member, an electron stream source situated adjacent said anode member remote from said flexible wall member for projecting a stream of electrons through said resonator, a repeller electrode, means mounting said repeller electrode to the other side of said resonator than said gun means and adjacent said flexible wall member, said means being mounted on said flange, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope, an intermediate portion extending across said envelope and a central portion secured to said hollow cylindrical sleeve member, and a tuning member secured to said central portion and extending into said hollow sleeve member for depressing said diaphragm, said sleeve, and said flexible wall member.

6. An electron discharge device of the reflex klystron type comprising an envelope, said envelope having an integral annular flange on its inner wall intermediate the ends thereof, means including a flexible wall member defining a cavity resonator mounted on said flange, an accelerating anode member mounted on said flange opposite said flexible wall member, an electron stream source, means secured to said anode for mounting said electron stream source adjacent said anode and remote from said flexible wall member, a repeller electrode, means mounting said repeller electrode to the other side of said resonator than said gun means and adjacent said flexible wall member, said means being mounted on said flange, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope, an intermediate portion extending across said envelope and a central portion secured to said hollow cylindrical sleeve member, and a tuning member secured to said central portion and extending into said hollow sleeve member for depressing said diaphragm, said sleeve, and said flexible wall member.

7. An electron discharge device of the reflux klystron type comprising an envelope, said envelope having an integral annular flange on its inner wall intermediate the ends thereof, means including a centrally apertured flexible wall member defining a cavity resonator mounted on said flange, grid means in the aperture of said wall member, means for centrally locating said grid relative to said cavity resonator comprising an annular flange on one side of said flexible wall member concentric with the aperture in said wall member, said flange abutting one surface of said annular flange on said envelope wall, electron gun means situated adjacent said resonator remote from said flexible wall member for projecting a stream of electrons through said resonator and through the aperture in said wall member, a repeller electrode, means mounting said repeller electrode to the other side of said resonator than said gun means and adjacent said flexible wall member, said means being mounted on said flange and contacting the peripheral edge of said flexible wall member whereby said repeller electrode is centrally located with respect to the aperture in said wall member, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope, an intermediate portion extending across said envelope and a central portion secured to said hollow cylindrical sleeve member, and a tuning member secured to said central portion and extending into said hollow sleeve member for depressing said diaphragm, said sleeve, and said flexible wall member.

8. An electron discharge device of the reflex klystron type comprising an envelope, said envelope having an integral annular flange on its inner wall intermediate the ends thereof, means including a centrally apertured flexible wall member defining a cavity resonator mounted on said flange, grid means in the aperture of said wall member, means for centrally locating said grid relative to said cavity resonator comprising an annular flange on one side of said flexible wall member concentric with the aperture in said wall member, said flange abutting one surface of said annular flange on said envelope wall, an accelerating anode member mounted on said flange opposite said flexible wall member, said accelerating anode having a hollow tubular portion centrally located with respect thereto, a grid located at the end of said tubular portion adjacent said flexible wall member, means for centrally locating said tubular portion with respect to the aperture in said flexible wall portion comprising an annular flange on one side of said accelerating anode and concentric with said tubular portion, said flange bearing against one surface of the flange on said envelope wall, an electron stream source situated adjacent said anode member remote from said flexible wall member for projecting a stream of electrons through said resonator past said grids, a repeller electrode, means mounting said repeller electrode to the other side of said resonator than said gun means and adjacent said flexible wall member, said means being mounted on said flange and contacting the peripheral edge of said flexible wall member whereby said repeller electrode is centrally located with respect to the aperture in said wall member, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope, an intermediate portion extending across said envelope and a central portion secured to said hollow cylindrical sleeve member, and a tuning member secured to said central portion and extending into said hollow sleeve member for depressing said diaphragm, said sleeve, and said flexible wall member.

9. An electron discharge device of the reflex klystron type comprising an envelope, said envelope comprising a hollow body member, an integral annular flange on the inside wall of said body member integral therewith, an apertured flexible wall member mounted on one surface of said flange, an accelerating anode mounted on a second surface of said flange, said wall member, said anode, and a third surface of said flange forming a cavity resonator, an electron stream source, means secured to said anode mounting said source in fixed relation to said anode and said flange adjacent said anode, a repeller electrode, means mounting said repeller electrode on the other side of said resonator from said source and adjacent said flexible wall member in fixed relation to said flange, said means being secured to said flange, a diaphragm member forming an end wall of said envelope, rigid means joining said diaphragm and said flexible wall member for communicating movement of said diaphragm to said flexible wall member, and means mounted externally of the envelope for moving said diaphragm.

10. An electron discharge device of the reflex klystron type comprising an envelope, said envelope comprising a hollow body member, an integral annular flange on the inside wall of said body member integral therewith, an apertured flexible wall member mounted on one surface of said flange, a grid located in the aperture of said wall member, an accelerating anode mounted on a second surface of said flange, said wall member, said anode, and a third surface on said flange forming a cavity resonator, means centrally locating the aperture in said flexible wall member with respect to said cavity resonator comprising an annular flange on one side of said flexible wall member concentric with the aperture in said wall member, said flange bearing against said third surface of said flange on said body member, an electron stream source, means secured to said anode mounting said source in fixed relation to said anode and said flange adjacent said anode, a repeller electrode, means mounting said repeller electrode on the other side of said resonator from said source and adjacent said flexible wall member in fixed relation to said flange, said means being secured to said flange, a diaphram member forming an end wall of said envelope, rigid means joining said diaphragm and said flexible wall member for communicating movement of said diaphragm to said flexible wall member, and means mounted externally of the envelope for moving said diaphragm.

11. An electron discharge device of the reflex klystron type comprising an envelope, said envelope comprising a hollow body member, an integral annular flange on the inside wall of said body member integral therewith, an apertured flexible wall member mounted on one surface of said flange, a grid located in the aperture of said wall member, an accelerating anode mounted on a second surface of said flange, said wall member, said anode, and a third surface of said flange forming a cavity resonator, means centrally locating the aperture in said flexible wall member with respect to said cavity resonator comprising an annular flange on one side of said flexible wall member concentric with the aperture in said wall member, said flange bearing against said third surface of said flange on said body member, an electron stream source, means secured to said anode mounting said source in fixed relation to said anode and said flange adjacent said anode, a repeller electrode, means mounting said repeller electrode on the other side of said resonator from said source and adjacent said flexible wall member in fixed relation to said flange, said means being secured to said flange, and bearing against the peripheral edge of said flexible wall member whereby said repeller electrode is centrally located with respect to the aperture in said flexible wall member, a diaphragm member forming an end wall of said envelope, rigid means joining said diaphragm and said flexible wall member for communicating movement of said diaphragm to said flexible wall member, and means mounted externally of the envelope for moving said diaphragm.

12. An electron discharge device of the reflex klystron type comprising an envelope, said envelope comprising a hollow body member, an integral annular flange on the integral therewith, an apertured flexible wall member mounted on one surface of said flange, a grid in said aperture, an accelerating anode mounted on a second surface of said flange, said accelerating anode having a hollow tubular portion centrally located with respect thereto, a grid in the end of said tubular portion adjacent said flexible wall member, said wall member, said anode, and a third surface of said flange forming a cavity resonator, means centrally locating the aperture in said flexible wall member with respect to said cavity resonator comprising an annular flange on one side of said flexible wall member concentric with the aperture in said wall member, said flange bearing against said third surface of said flange on said body member, means centrally locating said tubular portion of said anode member with respect to the aperture in said flexible wall member comprising an annular flange on one side of said wall member concentric with said tubular portion, said flange bearing against said third surface of said annular flange on the body member, an electron stream source, means secured to said anode mounting said source in fixed relation to said anode and said flange adjacent said anode, a repeller electrode, means mounting said repeller electrode on the other side of said resonator from said source and adjacent said flexible wall member in fixed relation to said flange, said means being secured to said flange, and bearing against the peripheral edge of said flexible wall member whereby said repeller electrode is centrally located with respect to the aperture in said flexible wall member, a diaphragm member forming an end wall of said envelope, rigid means joining said diaphragm and said flexible wall member for communicating movement of said diaphragm to said flexible wall member, and means mounted externally of the envelope for moving said diaphragm.

13. An electron discharge device of the reflex klystron type comprising an envelope, said envelope comprising a hollow metallic body portion having an annular flange on its inner wall intermediate the ends thereof, means including a flexible wall member defining a cavity resonator mounted on said flange, electron gun means situated adjacent said resonator remote from said flexible wall member for projecting a stream of electrons through said resonator, a repeller electrode, means mounting said repeller electrode to the other side of said resonator than said gun means and adjacent said flexible wall member, a slot in said body member passing through said flange and opening into said cavity resonator, a wave guide section mounted on the outside of said body, said slot opening into said wave guide section, electromagnetic wave permeable means vacuum sealing the outer end of said wave guide section, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope, an intermediate portion extending across said envelope and a central portion secured to said hollow cylindrical sleeve member, and a tuning member secured to said central portion and extending into said hollow sleeve member for depressing said diaphragm, said sleeve, and said flexible wall member.

14. An electron discharge device of the reflex klystron type comprising an envelope, said envelope comprising a hollow metallic body portion having an annular flange on its inner wall intermediate the ends thereof, means including a flexible wall member defining a cavity resonator mounted on said flange, electron gun means situated adjacent said resonator remote from said flexible wall member for projecting a stream of electrons through said resonator, a repeller electrode, means mounting said repeller eelctrode to the other side of said resonator than said gun means and adjacent said flexible wall member, a slot in said body member passing through said flange and opening into said cavity resonator, a wave guide section mounted on the outside of said body, said slot opening into said wave guide section, electromagnetic wave permeable means vacuum sealing the outer end of said wave guide section, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope an intermediate portion extending across said envelope and a central portion secured to said hollow cylindrical sleeve member, a tuning member secured to said central portion and extending into said hollow sleeve member for depressing said diaphragm, said sleeve, and said flexible wall member, and means for moving said tuning member axially comprising a driving member rotatably mounted externally of said envelope.

15. An electron discharge device of the reflex klystron type comprising an envelope, said envelope comprising a hollow metallic body portion having an annular flange on its inner wall intermediate the ends thereof, means including a flexible wall member defining a cavity resonator mounted on said flange, electron gun means situated adjacent said resonator remote from said flexible wall member for projecting a stream of electrons through said resonator, a repeller electrode, means mounting said repeller electrode to the other side of said resonator than said gun means and adjacent said flexible wall member, a slot in said body member passing through said flange and opening into said cavity resonator, a wave guide section mounted on the outside of said body, said slot opening into said wave guide section, electromagnetic wave permeable means vacuum sealing the outer end of said wave guide section, and means for tuning said resonator, said tuning means including a hollow cylindrical sleeve member surrounding said repeller electrode and bearing on said flexible wall member, said sleeve member having apertures in the side thereof through which the repeller mounting means extends, a flexible diaphragm forming an end closure for said envelope, said diaphragm having side portions secured to the walls of said envelope an intermediate portion extending across said envelope and a central portion secured to said hollow cylindrical sleeve member, a tuning member secured to said central portion and extending into said hollow sleeve member for depressing said diaphragm, said sleeve, and said flexible wall member, said tuning member having its end remote from said diaphragm threaded, and means for axially moving said tuning member comprising a hollow cylindrical intermediate portion having internal threads into which the threaded end of said tuning member is threaded, and having external threads thereon of a different pitch from said internal threads, said intermediate portion being threaded into a stationary member mounted on said envelope, and means for rotating said intermediate member comprising an adjusting wheel attached thereto.

References Cited in the file of this patent

UNITED STATES PATENTS

| 2,443,535 | Haas | June 15, 1948 |
| 2,566,584 | Shepherd | Sept. 4, 1951 |